July 17, 1934.    O. MOHR    1,967,039
SUPPORTING MEMBER
Filed Feb. 15, 1933
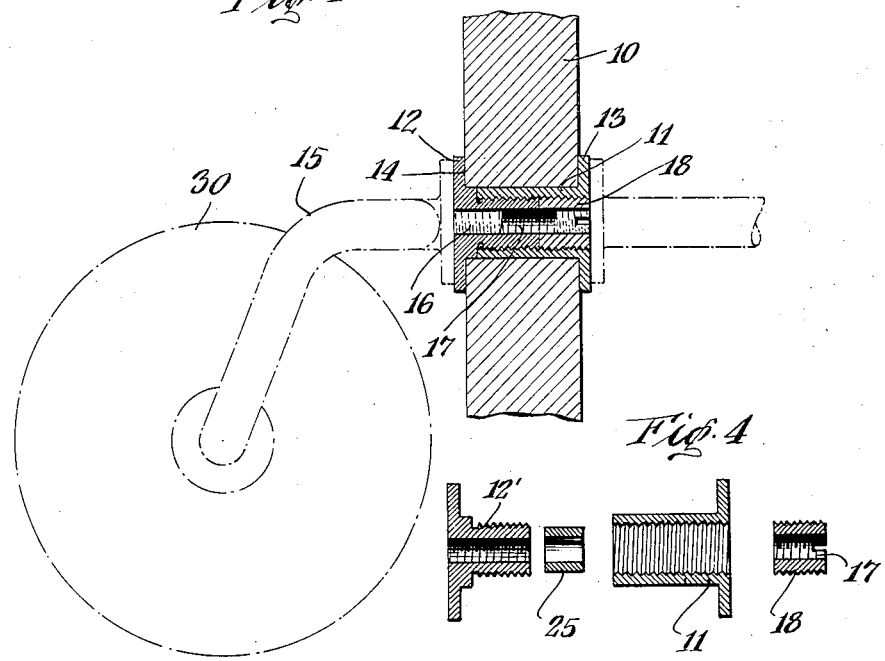
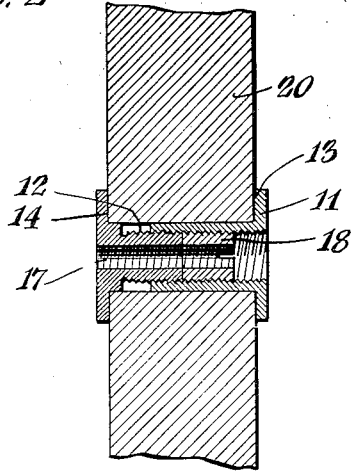
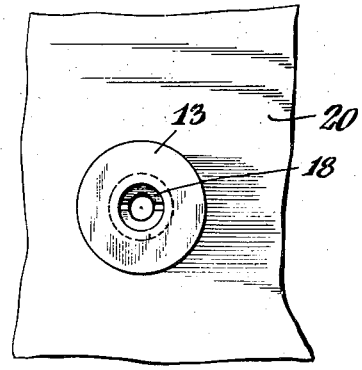
INVENTOR
Otto Mohr
BY
Hoguet & Neary
ATTORNEYS Patented July 17, 1934

1,967,039

UNITED STATES PATENT OFFICE 1,967,039

SUPPORTING MEMBER

Otto Mohr, Weehawken, N. J., assignor to Joseph A. Hoegger, North Bergen, N. J.

Application February 15, 1933, Serial No. 656,787

9 Claims. (Cl. 248—20)

This invention relates to mounting members and particularly to members for mounting surface applied articles on vitreous walls.

In accordance with a part of this invention we provide a mounting member consisting of a pair of suitably screw threaded cooperating flanged bushings. One of these bushings may be internally screw threaded and have a plane cylindrical outer surface and another of the bushings may be externally screw threaded to cooperate with the first bushing. A locking nut may be provided to lock these cooperating members in position. These members are especially adapted to secure surface applied articles, such as soap dishes, towel racks and the like, to vitreous walls or walls which consist of two pieces of glass with a space between them.

When these members are used for mounting surface applied articles to a laminated wall, the bushings may be locked together at the exact thickness desired which is a decided advantage in relieving all strain from the glass, thus preventing the customary trouble of cracking.

A small washer may be placed between the lock nut and the inner face of the internally screw threaded bushing, if deemed desirable, so that the cooperating bushings may readily be used with walls of different thicknesses.

An object of this invention is to provide a mounting member for mounting surface applied articles on a vitreous wall.

Another object of this invention is to provide a mounting member for mounting surface applied articles on vitreous walls with said members having an internally screw threaded portion adapted to receive and hold a screw supporting member.

A further object of the invention is to provide a mounting member for securing surface applied articles to a wall and which is adapted to be locked in place at a desired thickness.

These and other objects will be apparent to those skilled in this particular art from the claims and the description in the specification in connection with the drawing in which:

Figure 1 is a fragmentary side view in section of a mounting member, forming an illustrative embodiment of the invention, holding a surface applied article.

Figure 2 is a sectional side view of a mounting member locked in place in a section of a vitreous wall.

Figure 3 is a front elevation of Figure 2.

Figure 4 is an exploded view in section of a modification of the invention.

In the embodiment of the invention which has been chosen for the purposes of illustration and referring now to the drawing, in Figure 1 is shown a fragmentary section of a vitreous wall 10, which has been bored to receive an internally screw threaded bushing 11. An externally screw threaded bushing 12 is inserted in the bushing 11 and screwed to a point such that the inner face 13 of the flange on the bushing 11 and an inner face 14 on a flange of the bushing 12 snugly abut a section of the wall 10.

A supporting arm 15 of a surface applied article 30, such as a towel rack or soap dish, is secured to the wall 10 by means of a supporting screw 16 inserted into a suitably internally screw threaded portion 17 of the bushing 12. A lock nut 18 is secured against the internal end of the bushing 12 and holds the supporting organization fixedly in place without any undue strain upon the wall 10 which may be made of some frangible material such as glass.

In Figure 2 is shown a bushing, such as illustrated in Figure 1, used in connection with a wall 20 of greater thickness than the wall 10 and illustrates the nicety of adjustability of the supporting member illustrative of the invention. In this embodiment of the invention the bushing 12 is screw threaded into the bushing 11 just as described in connection with Figure 1. However, because of the thickness of the wall 20, their inter-engagement is not complete, but the nut 18 is screw threaded into the bushing 11 until it firmly engages the inner face of the bushing 12 and hence holds the members firmly in position snugly abutting a face of the wall 20. In this view the internally screw threaded portion 17, adapted to receive a mounting screw, is clearly shown and it is obvious that a screw, such as screw 16, illustrated in Figure 1, may be inserted, either from the end adjacent the face 14 of the bushing 12, or at the other end in the screw threaded passage formed in the locking nut 18. A suitable washer 25 as used in connection with the modification illustrated in Figure 4 may be used between the iner face of the bushing 12' and the abutting face of the locking member 18 so that the outer face of the locking member 18 will be substantially flush with the outer face 13 of the bushing 11 as it is in the embodiment of the invention illustrated in Figure 1.

In the embodiment of the invention illustrated in Figure 4 the bushing 11 is similar to the bushing 11 described in connection with Figure 1. In this embodiment of the invention, however, the externally screw threaded member 12' may be provided with an ordinary rivet head so that the screw threaded passage 17 is accessible only from the end adjacent the flange portion 13 of the bushing 11. In this modification of the invention it is particularly desirable that the outer face of the locking member 18 be spaced adjacent the outer face 13 of the bushing 11 and in this modification of the invention a suitable washer 25 may be provided to effect this result when this mounting member is to be used in connection with glass walls of a thickness such as illustrated in connection with the wall 20 illustrated in Figure 2.

Certain specific embodiments of the invention have been described in some detail but it is to be understood that changes, additions, substitutions and omissions may be made therein within the spirit of the invention as defined in the appended claims.

I claim:

1. An adjustable member for mounting surface articles to partitions and including a flanged member having internally and externally screw threaded portion, a cooperating flanged member having an internally screw threaded portion and a locking member threaded in said internally threaded member adapted to hold said members fixedly in position.

2. A mounting member for mounting surface applied articles to partitions and the like and including a flanged internally and externally threaded member, a flanged internally threaded member cooperating with said externally threaded member and a locking member threaded in said internally threaded member and abutting the inner end of said externally threaded member.

3. A mounting member for mounting surface applied articles to partitions and the like and including a flanged internally and externally threaded member having an internally threaded portion, a flanged internally threaded member cooperating with said externally threaded member, a locking member threaded in said internally threaded member adapted to hold said members fixedly in position and a screw adapted to be inserted in the internally threaded portion of said externally threaded member for securing a surface applied article to said mounting member.

4. A mounting member for mounting surface applied articles to partitions and the like and including a flanged externally threaded member, a flanged internally threaded member cooperating with said externally threaded member, a locking member having an externally threaded portion and an internally threaded portion adapted to hold said members fixedly in position, a screw member adapted to be inserted in the internally screw threaded portion of said locking member for securing a surface applied article to said mounting member.

5. A mounting member for mounting surface applied articles to partitions and the like and including a flanged externally threaded member having an internally threaded portion, a flanged internally threaded member cooperating with said externally threaded member, a locking member having an externally threaded portion and an internally threaded portion adapted to hold said members fixedly in position and a screw threaded member adapted to be inserted in the internally screw threaded portion of said externally threaded member and said locking member for securing a surface applied article to said mounting member.

6. A mounting member for mounting surface applied articles to partitions and the like, including an externally threaded member, an internally threaded member adapted to be threaded over said externally threaded member, a locking member having an externally threaded portion adapted to be threaded into said internally threaded member and to abut against the end of said externally threaded member, said externally threaded member and said locking member being adapted to carry a surface applied article.

7. A mounting member for mounting surface applied articles to partitions and the like, including an externally threaded tubular member, an internally threaded member adapted to be threaded over said externally threaded member, a locking member having an externally threaded portion adapted to be threaded into said internally threaded member, and to bear against the end of said externally threaded member, and a flanged stem member adapted to be inserted in and attached to said externally threaded tubular member for securing a surface applied article to said mounting member.

8. A mounting member for mounting surface applied articles to partitions and the like, including an externally threaded tubular member, an internally threaded member adapted to be threaded over said externally threaded member, a tubular locking member having an externally threaded portion adapted to be threaded into said internally threaded member and to bear against the end of said internally threaded member, and a flanged stem member adapted to be inserted in said tubular locking member and attached thereto for securing a surface applied article to said mounting member.

9. A mounting member for mounting surface applied articles to partitions and the like and including a member internally screw-threaded to receive said article, and flanged to engage one surface of said partition, a second member flanged to engage the other surface of said partition, and internally screw-threaded, said first member being also externally screw-threaded to cooperate with said second member, and a locking member threaded in said second member and abutting the inner end of said first member.

OTTO MOHR.